United States Patent [19]

Tamura

[11] Patent Number: 4,888,515
[45] Date of Patent: Dec. 19, 1989

[54] ROTARY POWER UNIT

[75] Inventor: Shuichi Tamura, Yokohama, Japan

[73] Assignee: Canon Kabushiki Kaisha, Tokyo, Japan

[21] Appl. No.: 243,214

[22] Filed: Sep. 12, 1988

Related U.S. Application Data

[63] Continuation of Ser. No. 942,618, Dec. 17, 1986, abandoned.

[30] Foreign Application Priority Data

Dec. 25, 1985 [JP] Japan .............................. 60-295309

[51] Int. Cl.$^4$ ............................................. H01L 41/08
[52] U.S. Cl. .................................... 310/323; 310/317; 310/328
[58] Field of Search ................... 310/323,328,316,317; 318/116, 118

[56] References Cited

U.S. PATENT DOCUMENTS

| 4,019,073 | 4/1977 | Vishnevsky et al. | 310/323 |
| 4,339,682 | 7/1982 | Toda et al. | 310/321 |
| 4,400,641 | 8/1983 | Vishnevsky et al. | 310/323 |
| 4,495,432 | 1/1985 | Katsuma et al. | 310/328 |
| 4,562,374 | 12/1985 | Sashida | 310/328 |
| 4,634,916 | 1/1987 | Okada et al. | 310/323 |
| 4,782,262 | 11/1988 | Kiyo-Oka | 310/323 |

FOREIGN PATENT DOCUMENTS

| 0229680 | 11/1985 | Japan | 310/328 |
| 0642802 | 1/1979 | U.S.S.R. | 310/328 |
| 0744792 | 7/1980 | U.S.S.R. | 310/323 |
| 0748583 | 7/1980 | U.S.S.R. | 310/323 |

Primary Examiner—Mark O. Budd
Attorney, Agent, or Firm—Fitzpatrick, Cella, Harper & Scinto

[57] ABSTRACT

A rotary power unit has a first vibration member; a second vibration member having a different phase than that of said first vibration member; a ring member rotatably supported by the first vibration member and the second vibration member, the ring member being adapted to make an eccentric rotation by the vibrations of the first vibration member and the second vibration member; and an output member having a smaller outer diameter than an inner diameter of said ring member, the output member being adapted to make a rotary motion in partial and internal contact with the ring member by the eccentric rotation of the ring member.

5 Claims, 1 Drawing Sheet

ROTARY POWER UNIT

This application is a continuation-in-part of application Ser. No. 942,618 filed Dec. 17, 1986, now abandoned.

BACKGROUND OF THE INVENTION

1. Field of the Invention

The present invention relates to an apparatus for translating a reciprocal motion to a rotary motion, and more particularly to an electro-mechanical transducing rotary power unit for generating a rotary motion by vibration of two or more vibration members having a phase difference therebetween.

2. Related Background Art

A vibration motor has been widely used as a rotary power unit. Because it performs electro-mechanical transducing, it produces an electromagnetic noise. Moreover, the manufacture of a coil in such motors is troublesome.

SUMMARY OF THE INVENTION

It is an object of the present invention to provide an electro-mechanical transducing rotary power unit which comprises a first vibration member, a second vibration member having a different phase than that of the first vibration member, a ring member rotatably supported by the first vibration member and the second vibration member and adapted to be eccentrically rotated by the vibrations of the first vibration member and the second vibration member, and an output member having a larger outer diameter than an inner diameter of the ring member and adapted to be rotated in partial and internal contact with the ring member by the eccentric rotation of the ring member. Thus, rotary power is efficiently produced with a simple construction without electro-magnetic transducing.

It is another object of the present invention to provide a rotary power unit which comprises first vibration means for vibrating at a predetermined vibration frequency, second vibration means for vibrating at the predetermined vibration frequency with a different phase than that of the first vibration means, ring-shaped drive means supported by the first and second vibration means and adapted to be eccentrically rotated by the vibrations of the first vibration means and the second vibration means, and output means in internal contact with the ring-shaped drive means and adapted to be rotated by the eccentric rotation of the drive means.

DESCRIPTION OF THE PREFERRED EMBODIMENT

Figure 1:
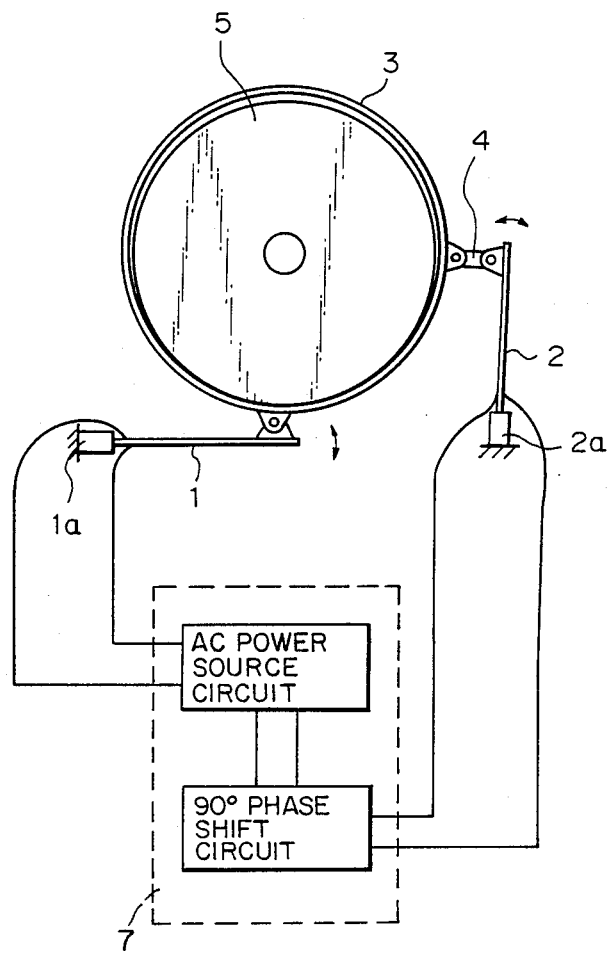
FIG. 1 shows an embodiment of a rotary power unit of the present invention.

FIG. 1 shows a construction of a rotary power unit of the present invention applied to a single-lens reflex type camera. Numerals 1 and 2 denote Bimorphes which are vibration members of piezoelectric elements. One end 1a or 2a of each Bimorph is fixed. A drive ring 3 which is a ring member is rotatably pivoted to the other end of the Bimorph 1, a pivot plate 4 is rotatably pivoted to the other end of the Bimorph 2, and the drive ring 3 is rotatably pivoted to the other end of the pivot plate 4. Numeral 5 denotes a rotary disk which is an output member having a center thereof rotatably supported by a base plate (not shown).

In the above arrangement, an A.C., signal of a predetermined frequency is generated by a drive circuit 7 as shown in USP 4,510,411 and applied to the Bimorph 1, which is repeatedly flexed in proportion to the applied voltage. As a result, the bimolf 1 generates a vibration in a direction of an arrow. In the present embodiment, the pivot point of the Bimorph 1 and the drive ring 3, and the pivot point of the Bimorph 2 and the pivot plate 4 form an angle of 90° with respect to the center of the rotary disk 5. An A.C. voltage having the same frequency as that applied to the Bimorph 1 and a phase having a phase difference of 90° from that applied to the Bimorph 1 is applied to the Bimorph 2 by the drive circuit 7. An inner diameter of the drive ring 3 is slightly larger than an outer diameter d of the rotary disk 5. The applied voltages are selected such that the Bimorph 1 and 2 vibrate at an amplitude $\delta$, where $\delta$ is a difference between the outer diameter of the rotary disk 5 and the inner diameter of the drive ring 3. Thus, the drive ring 3 makes an eccentric motion while it always partially contacts to the rotary disk 5. That is, the contact point of the drive ring 3 with the rotary disk 5 rotates. As the drive ring 3 makes one revolution of eccentric motion in one period of the A.C. voltage applied to the Bimorph, the rotary disk 5 is rotated by an angle corresponding to the difference between the inner diameter of the drive ring 3 and the outer diameter of the rotary disk 5. Since the outer diameter of the rotary disk 5 is equal to d, it is rotated by an angle of $(\delta/d) \times 360°$. If the phase of the A.C. voltage applied to the Bimorph 2 is in advance of 90° to the phase of the A.C. voltage applied to the Bimorph 1, the drive ring 3 makes a clockwise circular motion and the rotary disk 5 rotates counterclockwise. If the phase of the A.C. voltage applied to the Bimorph 2 is in retard of 90° to the phase of the A.C. voltage applied to the Bimorph 1, the drive ring 3 and the rotary disk 5 rotate in the opposite directions, respectively.

In this manner, the electrical energies imparted to the Bimorph 1 and 2 are converted to mechanical energies and a rotary power is generated by the rotary disk 5.

In the present embodiment, Bimorphes are used as the piezoelectric elements, although other piezoelectric elements such as laminated piezoelectric elements comprising a stack of elements whose thicknesses change upon application of voltages may be used. In this case, however, the force generated is larger but the displacement is smaller than those obtained by the Bimorphes and the use of a displacement magnification mechanism by a lever is preferable.

In the present embodiment, two piezoelectric elements are used for the purpose of simplicity, although three or more elements may be used. In this case, the arrangement of the action points of the piezoelectric elements to the drive ring is correlated to the phases of the A.C. voltages. As the number of piezoelectric elements increases, the output torque will increase accordingly.

In accordance with the present invention, there is provided an electro-mechanical transducing apparatus, which comprises a first vibration member, a second vibration member having a different phase than that of the first vibration member, a ring member rotatably supported by the first vibration member and the second vibration member and adapted to be eccentrically rotated by the vibration of the second vibration member, and an output member having a smaller outer diameter than an inner diameter of the ring member and adapted to make a rotary motion in partial and internal contact with the ring member by the eccentric rotation of the ring member. Thus, the electrically generated vibrations are transduced to the continuous rotary motion with simple construction and high efficiency.

I claim:

1. A rotary power unit comprising:
   a rotatably supported rotary disk having an outer diameter;
   a driving ring having an inner diameter greater than the outer diameter of said disk and being provided so as to surround said disk, with a portion of an inner periphery of said ring being able to contact a portion of an outer periphery of said disk;
   a first piezoelectric member having a first end fixedly secured and a second end operatively engaged to a first portion on an outer periphery of said ring, said first piezoelectric member oscillating in response to a first alternating signal so that a first point on the inner periphery of said ring contacts the outer periphery of said disk; and
   a second piezoelectric member having one end fixedly secured and a second end operatively engaged with a second portion on the outer periphery of said ring, with the second portion spaced from the first portion by approximately 90° around a perimeter of said ring, said second piezoelectric member oscillating in response to a second alternating signal having a 90° phase difference from the first alternating signal so that a second point on the inner periphery of said ring contacts the outer periphery of said disk.

2. A rotary power unit according to claim 1, wherein said first piezoelectric member is a bimorph.

3. A rotary power unit according to claim 2, wherein said second piezoelectric member is a bimorph.

4. A rotary power unit according to claim 1 further comprising a pivot plate linking said second end of said second piezoelectric member and the second portion on the outer periphery of said ring.

5. A rotary power unit comprising:
   a rotatably supported rotary disk;
   a driving ring having an inner diameter greater than the outer diameter of said disk and being provided so as to surround said disk, with a portion of an inner periphery of said ring being able to contact a portion of an outer periphery of said disk;
   a first piezoelectric member having a first end fixedly secured and a second end operatively engaged to a first portion on an outer periphery of said ring, said first piezoelectric member oscillating in response to a first alternating signal so that a first point on an inner periphery of said ring contacts the outer periphery of said disk; and
   a second piezoelectric member having a first end fixedly secured and a second end operatively engaged with a second portion on the outer periphery of said ring, with the second portion spaced from the first portion by a predetermined distance around a perimeter of said ring, said second piezoelectric member oscillating in response to a second alternating signal having a predetermined amount of phase difference from the first alternating signal so that a second point on the inner periphery of the said ring contacts the outer periphery of said disk.

* * * * *

UNITED STATES PATENT AND TRADEMARK OFFICE
CERTIFICATE OF CORRECTION

PATENT NO. : 4,888,515
DATED : December 19, 1989
INVENTOR(S) : Shuichi Tamura

It is certified that error appears in the above-identified patent and that said Letters Patent is hereby corrected as shown below:

COLUMN 1:

Line 4, "continuation-in-part" should read --continuation--

Line 61, "Bimorphes" should read --Bimorphs--.

COLUMN 2:

Line 3, "A.C., signal" should read --A.C. signal--.

Line 7, "bimolf 1" should read --Bimorph 1--.

Line 19, "Bimorph 1 and 2" should read --Bimorphs 1 and 2--

Line 42, "Bimorph 1 and 2" should read --Bimorphs 1 and 2--

Line 44, "Bimorphes" should read --Bimorphs--.

Line 50, "Bimorphes" should read --Bimorphs--.

Signed and Sealed this

Twenty-sixth Day of March, 1991

*Attest:*

HARRY F. MANBECK, JR.

*Attesting Officer*  *Commissioner of Patents and Trademarks*